May 14, 1946.   J. J. GETGEY ET AL   2,400,405
AUTOMATIC BASTING DEVICE
Filed July 8, 1943   2 Sheets-Sheet 1

INVENTOR.
John J. Getgey
Charles F. Kruea
BY
Wood, Arey, Herron & Evans
Attorneys May 14, 1946.   J. J. GETGEY ET AL   2,400,405
AUTOMATIC BASTING DEVICE
Filed July 8, 1943   2 Sheets-Sheet 2
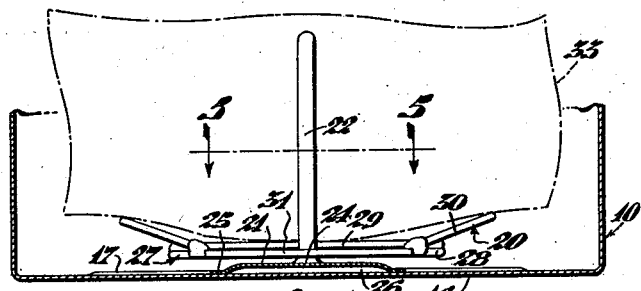
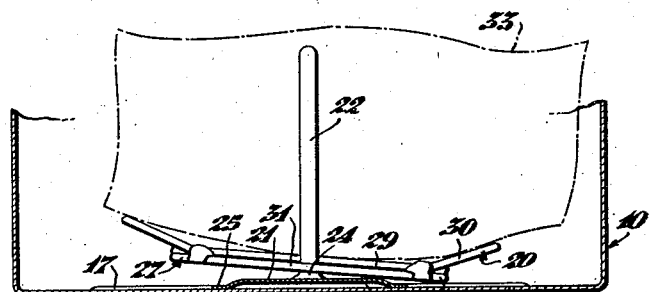
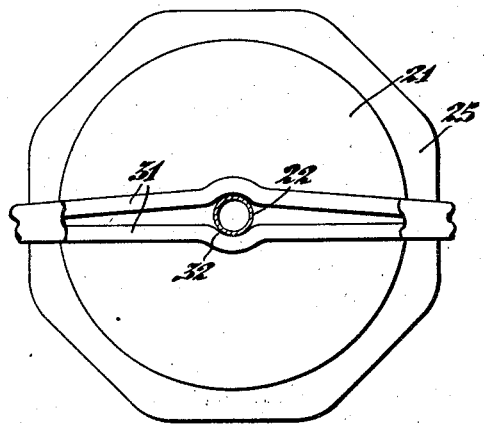
INVENTOR.

Patented May 14, 1946

2,400,405

UNITED STATES PATENT OFFICE 2,400,405

AUTOMATIC BASTING DEVICE

John J. Getgey, Cincinnati, Ohio, and Charles H. Kruea, Fort Thomas, Ky.; said Getgey assignor to Munny Manufacturing Company, Cincinnati, Ohio, a corporation Application July 8, 1943, Serial No. 493,898

4 Claims. (Cl. 99—346)

This invention relates to devices for basting roasts and other cuts of meat and is particularly concerned with a device of the automatic type, that is, one which operates continuously and effectively from the beginning of the roasting operation without attention from the cook. The device of the invention is preferably intended for use in conjunction with a roasting pan although the utility is not limited to this use.

Various types of automatic basting devices designed to provide a percolating action of the meat juice, or other liquid, in the bottom of the roasting pan have been provided in the past. Some of these earlier devices have included a base element adapted to rest on the base of the roasting pan or the roasting compartment of the oven with a plurality of apertures in this base element adjacent the bottom of the pan or roasting compartment for the introduction of the basting fluid into a chamber which is a component part of the base element. After the fluid is introduced into the chamber in the base it is then forced upwardly through a tube associated with the base and ultimately sprayed over the surface of the roast. The concept of these devices of the prior art has been that a boiling action will occur in the chamber in the base of the device and this boiling action will force the fluid upwardly in sufficient quantities to accomplish the desired result.

We have found that devices of this general type are ineffective to accomplish adequate basting because, if the apertures in the base are sufficiently large to permit the ready flow of fluid into the chamber, the fluid will be insufficiently confined to produce an effective percolating action at proper roasting temperatures. If the fluid boils at all it will not do so in such a way as to provide a regular movement of the liquid up the tube and over the roast. On the other hand, if the apertures are small enough to provide an effective thermal chamber, they will tend to become clogged with minute particles and their utility will be seriously impaired.

In short, we have concluded that the only effective solution to the problem is to completely eliminate the apertures in the base and to provide for the introduction of the fluid into the chamber by seepage action under the edges of the base. In this way the thermal chamber within the base is sufficiently closed to produce an effective percolating action, while at the same time there are no apertures which will tend to become clogged.

However, in providing a structure having these advantages a further problem has arisen in that as the roast cooks it tends to shrivel more on one side than the other. Since, in the type of device to which this invention is directed, it is contemplated that the roast will be supported indirectly at least by the basting elements and this shriveling action tends to change the center of gravity of the roast, eventually the unequal distribution of weight causes the basting devices to tilt to an extent which renders ineffective the operation of the thermal chamber within the base. In our present invention we have solved this problem by suspending the roast with respect to a pair of basting units in such a way that the shriveling of the roast will not affect the stability of the units or the relative positioning of their supporting bases with respect to the bottom of the roasting pan.

From the above it may be seen that one of the objects of the present invention has been to provide a basting device having a substantially closed thermal chamber associated with the base of the device for the purpose of improving the percolating action of basting fluids enclosed in the chamber.

Another object has been the complete elimination of fluid introduction apertures from the basting device.

Another object has been the provision of means for suspending a roast with respect to one or more basting devices in such a way that the change of the center of gravity of the roast due to shriveling will not affect the positioning of the basting devices with respect to the base of the roasting pan or stove compartment.

Another object has been the provision of a basting device of the type indicated which can be readily disassembled into its component parts for cleaning.

Another object has been the provision of a device of the character described which may be formed simply and cheaply from sheet metal or similar materials.

Other objects and advantages will be apparent from the further and more detailed description of the invention when considered in conjunction with the drawings in which:

Figure 3 is a sectional view along the line 3—3, Figure 1.

Figure 4 is a similar view illustrating the manner in which the device operates upon displacement of the center of gravity of the roast due to shriveling or, in this case, to an initially unequal distribution of the weight of the roast.

Figure 5 is a sectional view along the line 5—5, Figure 3.

Figure 1:
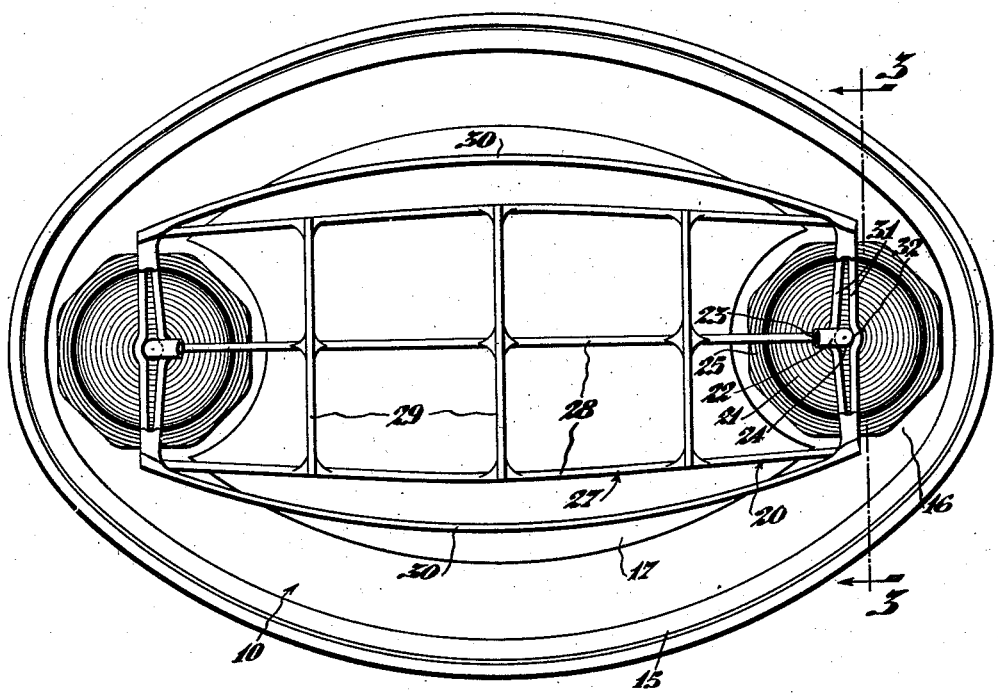
Figure 1 is a top plan view of a preferred embodiment of the invention in operative position on the base of a roasting pan of conventional construction.
Figure 2:
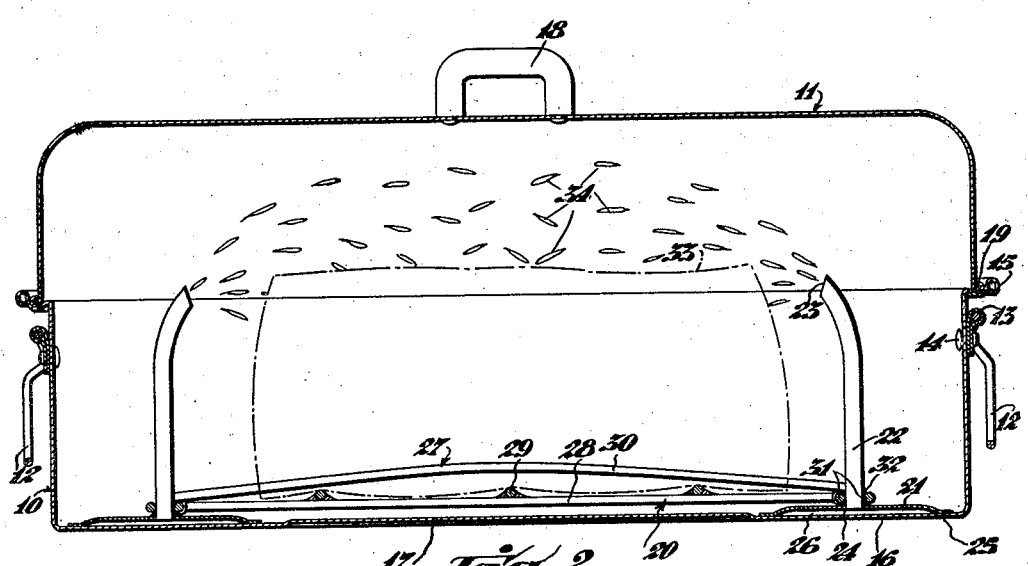
Figure 2 is a side elevation of the device in operation in an enclosed roasting pan with the side of the pan broken away to illustrate better the operation and utility of the device.

Referring now to the drawings for a further and more detailed description of the preferred embodiment of the invention there illustrated, a roasting pan of generally conventional construction is illustrated in Figures 1 and 2. The base or lower section of this pan has been designated as 10 and the top or upper section as 11. The lower section may include handles 12 at either end thereof. These handles may be hingedly connected to the hinge element 13 which element may be affixed to the pan by attaching elements such as the rivets 14. The lower section of the pan may also include a peripheral flange 15 for the support of the upper section. For the proper operation of the basting device it is highly important that the base of the pan be flat on its ends as at 16. It is also preferable that the central portion of the base be raised slightly as at 17 to permit the basting fluids to drain toward the basting units.

The upper section of the pan may include the handle 18 and may have its edges rolled as at 19. These edges are supported on the flange 15 of the lower section of the pan. This construction of both the lower and upper section of the pans is relatively conventional and forms no part of the present invention.

Disposed on the base of the lower section of the pan is the basting device of the invention which is indicated generally as 20. This device in its preferred embodiment comprises a pair of basting units of identical construction positioned one at either end of the pan. Each of these units comprises a base 21 and an upstanding tube or spout 22 having an open upper end 23 which is preferably inclined inwardly toward the center of the roasting pan. The spout is secured to the upper surface of the base at a central point such as 24. An opening (not shown) in the upper surface of the base permits the free passage of liquids confined in the base upwardly into the spout. The base which may be formed from relatively thin sheet metal is configurated to provide the dome shaped thermal chamber 26 between the upper surface of the base and the lower surface of the roasting pan. A peripheral flange 25 extends around the outer edge of the base and seats flatly on the base of the pan except for surface inequalities. In the operation of the device the basting liquid seeps under the edges of this flange 25 and into the chamber 26 in sufficient amounts to provide for a regular and effective percolating action in the confines of the chamber.

A rack which is designated generally as 27 is suspended between the two basting units in the manner best shown in Figure 1. This rack may include a plurality of longitudinal ribs 28 and cross ribs 29 secured to the longitudinal ribs at the points of juncture. A pair of outwardly bowed longitudinal ribs 30 may be provided one at each side of the rack and these ribs may be elevated slightly above the longitudinal ribs 28 to provide a firmer support for the roast. A pair of end ribs 31 spaced slightly apart are joined to the longitudinal ribs 28 and the outwardly bowed ribs 30 at each end of the device completing the frame work of the rack. These end ribs 31 may be configurated at a central point to provide sockets 32 adapted to fit loosely on the tubes 22 and support the rack on the upper surface of the bases 21 of the basting units.

The operation of the device is best illustrated in Figure 2. When the basting units and rack have been set up on the base of the roasting pan in the manner there illustrated, the roast 33 is placed in a central position on the rack. Preferably, a small quantity of water is then poured on the base of the pan to increase the volume of the basting fluid. When the pan is exposed to heat this water mixes with the natural juices of the meat and the basting fluid thus formed seeps under the edges of the flanges 25 of the basting units where it boils in the confined thermal chambers 26. The fluid then is forced upwardly in the tubes 22 and sprays over the roast in drops 34 from the open ends 23 of the tubes. Thereafter this fluid together with the juices from the meat descends again to the bottom of the pan, drains to the ends, seeps into the thermal chambers and the operation is repeated. It is probable that the reason that the basting fluid seeps under the flanges 25 is because of the vacuum created in the thermal chamber due to the heating of the air therein and the resulting suction thereby created. Since the entire base of the units is preferably formed from light sheet metal, the flanges 25 will not seat prefectly flatly on the base of the pan and the ordinary surface inequalities have been found to be sufficient to permit the fluid to enter under the flange.

The operation of the device is not entirely the same as the operation of a coffee percolator because the degree of heat applied is much less as is the quantity of the fluid. Instead of a continuous action as in a percolator, the basting units tend to work more spasmodically, apparently because it is necessary to build up a head of steam in the thermal chamber before sufficient force is created to expel the drops of fluid upwardly. Since in meat basting it is only necessary that the roast be kept moist, a large quantity of basting fluid is not necessary and, after the initial supply of water has been poured in the pan, further additions should not be required.

It will be apparent that the rack may be secured to the basting unit in various different ways. The one shown as the preferred embodiment is highly effective because the provision of the pair of end ribs straddling the tube tends to distribute the weight of the roast evenly on the bases of the basting units. In addition, it is a relatively simple matter to remove the rack from the units so that all of the elements can be cleaned after each basing operation.

It is not absolutely essential that the basting device be combined with a roasting pan and it will work effectively in the roasting compartment of an oven. If desired, the degree of inclination of the tube ends 23 may be changed to meet particular conditions.

Having described our invention, we claim:

1. A device for automatically basting meats during roasting, comprising a pair of basting units, each of said basting units comprising a dome-shaped base section and an upstanding tubular section interconnected therewith, and a meat supporting rack for swingably suspending a cut of meat between the basting units, said rack having sockets formed at each end thereof, each of said sockets engaging loosely around the tubular section of a basting unit so as to permit rocking of the rack from an unequal distribution of the weight of the meat positioned thereon.

2. A device for automatically basting meats during roasting, comprising in combination a roasting pan, the base of said pan having substantially flat ends and an elevated center, a pair of basting units, each of said units having a dome-shaped base portion, a peripheral flange extending around said dome-shaped portion and an upstanding tubular portion interconnected with the dome-shaped portion, said basting units being adapted to seat substantially flush on the flat base portions of the pan, and a meat supporting rack suspended between said basting units and supported thereby, whereby fluid on the base of the pan will drain to the ends, seep into the dome-shaped portions of the bases of the basting units, rise in the tubular portions due to thermal action and be sprayed over the meat on the rack in a continuous basting action.

3. A basting device comprising in combination a basting unit adapted to be positioned on the base of a roasting pan, said unit having a dome-shaped section forming a thermal chamber and a spout extending upwardly from said thermal chamber and a meat supporting rack suspended from said unit, said rack being mounted on top of and in contact with the dome-shaped section and being normally spaced from the base of the roasting pan, said rack being tiltably mounted with respect to the basting unit so that when tilted it contacts the base of the roasting pan thus permitting the dome to remain in its original position, whereby said dome can function as a thermal chamber regardless of the position in which said rack is tilted.

4. In combination with a roasting pan, a basting device comprising a basting unit adapted to be positioned on the base of the pan, said unit including a base and an upstanding tubular section connected therewith, a meat supporting rack suspended from the basting unit, said rack being mounted on top of and in contact with the base of said unit and being normally spaced from the base of the roasting pan, said rack being rockingly mounted with respect to the basting unit so that when rocked it contacts the base of the roasting pan thus permitting the base of the unit to remain in its original position, thus insuring operation of the basting unit regardless of the position of the rack.

JOHN J. GETGEY.
CHARLES H. KRUEA.